US 8,389,174 B2

(12) United States Patent
Vyas et al.

(10) Patent No.: US 8,389,174 B2
(45) Date of Patent: Mar. 5, 2013

(54) SUPER-HYDROPHILIC NANOPOROUS ELECTRICALLY CONDUCTIVE COATINGS FOR PEM FUEL CELLS

(75) Inventors: Gayatri Vyas, Rochester Hills, MI (US); Mahmoud H. Abd Elhamid, Grosse Pointe Woods, MI (US); Youssef M. Mikhail, Sterling Heights, MI (US); Thomas A. Trabold, Pittsford, NY (US)

(73) Assignee: GM Global Technology Operations LLC, Detroit, MI (US)

(*) Notice: Subject to any disclaimer, the term of this patent is extended or adjusted under 35 U.S.C. 154(b) by 2268 days.

(21) Appl. No.: 11/341,355

(22) Filed: Jan. 27, 2006

(65) Prior Publication Data

US 2007/0178357 A1   Aug. 2, 2007

(51) Int. Cl.
H01M 2/38 (2006.01)
H01M 2/40 (2006.01)
H01M 8/24 (2006.01)
B05D 5/12 (2006.01)

(52) U.S. Cl. .................. 429/457; 429/455; 427/115

(58) Field of Classification Search .......... 429/38, 429/457, 455; 427/115
See application file for complete search history.

(56) References Cited

U.S. PATENT DOCUMENTS

| | | | | |
|---|---|---|---|---|
| 5,364,711 A | * | 11/1994 | Yamada et al. ............ | 429/15 |
| 2001/0021470 A1 | * | 9/2001 | May et al. ............... | 429/44 |
| 2001/0031389 A1 | * | 10/2001 | Appleby et al. ........... | 429/40 |
| 2002/0187379 A1 | * | 12/2002 | Yasuo et al. .............. | 429/34 |
| 2003/0003345 A1 | * | 1/2003 | Ohara et al. .............. | 429/38 |
| 2003/0042226 A1 | * | 3/2003 | Coll et al. ............... | 216/41 |
| 2003/0138686 A1 | * | 7/2003 | Kotani et al. ............. | 429/32 |
| 2003/0211380 A1 | * | 11/2003 | Hiroi et al. .............. | 429/44 |
| 2003/0235735 A1 | * | 12/2003 | Miyazawa et al. ......... | 429/26 |
| 2004/0247978 A1 | | 12/2004 | Shimamune | |
| 2006/0228606 A1 | * | 10/2006 | Fiebig et al. ............. | 429/32 |

FOREIGN PATENT DOCUMENTS

JP 6203852 (A) 7/1994
JP 2001-325966 A 11/2001

OTHER PUBLICATIONS

Vyas, G. et al., U.S. Utility patent application entitled "Method to Make Conductive Hydrophilic Fuel Cell Elements", U.S. Appl. No. 11/068,489, filed Feb. 28, 2005.
Vyas, G. et al., U.S. Utility patent application entitled "Durable Hydrophilic Coatings for Fuel Cell Bipolar Plates", U.S. Appl. No. 11/089,525, filed Mar. 24, 2005.

(Continued)

Primary Examiner — Patrick Ryan
Assistant Examiner — Julian Anthony
(74) Attorney, Agent, or Firm — John A. Miller; Miller IP Group, PLC

(57) ABSTRACT

A flow field plate or bipolar plate for a fuel cell that includes a conductive coating having formed nanopores that make the coating hydrophilic. Any suitable process can be used to form the nanopores in the coating. One process includes co-depositing a conductive material and a relatively unstable element on the plate, and then subsequently dissolving the element to remove it from the coating and create the nanopores. Another process includes using low energy ion beams for ion beam lithography to make the nanopores.

30 Claims, 2 Drawing Sheets

OTHER PUBLICATIONS

Vyas, G. et al., U.S. Utility patent application entitled "Metal Oxide Based Hydrophilic Coatings for PEM Fuel Cell Bipolar Plates", U.S. Appl. No. 11/089,526, filed Mar. 24, 2005.

Vyas, G. et al., U.S. Utility patent application entitled "Stable Conductive and Hydrophilic Fuel Cell Contact Element", U.S. Appl. No. 11/172,021, filed Jun. 30, 2005.

Vyas, G. et al., U.S. Utility patent application entitled Durability for the MEA and Bipolar Plates in PEM Fuel Cells using Hydrogen Peroxide Decomposition Catalysts, U.S. Appl. No. 11/196,632, filed Aug. 3, 2005.

Vyas, G. et al., U.S. Utility patent application entitled Fuel Cell Contact Element Including TiO2 Layer and a Conductive Layer, U.S. Appl. No. 11/201,767, filed Aug. 11, 2005.

Vyas, G. et al., U.S. Utility patent application entitled Improving the Water Management Properties of PEM Fuel Cell Bipolar Plates using Carbon Nano Tube Coatings, U.S. Appl. No. 11/215,105, filed Aug. 30, 2005.

* cited by examiner

SUPER-HYDROPHILIC NANOPOROUS ELECTRICALLY CONDUCTIVE COATINGS FOR PEM FUEL CELLS

BACKGROUND OF THE INVENTION

1. Field of the Invention

This invention relates generally to bipolar plates for fuel cells and, more particularly, to a bipolar plate for a fuel cell that includes a conductive coating having nanopores that make the coating hydrophilic.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. For the automotive fuel cell stack mentioned above, the stack may include two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of flow field or bipolar plates positioned between the several MEAs in the stack. The bipolar plates include an anode side and a cathode side for adjacent fuel cells in the stack. Anode gas flow channels are provided on the anode side of the bipolar plates that allow the anode gas to flow to the anode side of the MEA. Cathode gas flow channels are provided on the cathode side of the bipolar plates that allow the cathode gas to flow to the cathode side of the MEA. The bipolar plates also include flow channels through which a cooling fluid flows.

The bipolar plates are typically made of a conductive material, such as stainless steel, titanium, aluminum, polymeric carbon composites, etc., so that they conduct the electricity generated by the fuel cells from one cell to the next cell and out of the stack. Metal bipolar plates typically produce a natural oxide on their outer surface that makes them resistant to corrosion. However, the oxide layer is not conductive, and thus increases the internal resistance of the fuel cell, reducing its electrical performance. Also, the oxide layer makes the plate more hydrophobic. It is known in the art to deposit a thin layer of a conductive material, such as gold, on the bipolar plates to reduce the contact resistance between the plate and diffusion media in the fuel cells.

As is well understood in the art, the membranes within a fuel cell need to have a certain relative humidity so that the ionic resistance across the membrane is low enough to effectively conduct protons. During operation of the fuel cell, moisture from the MEAs and external humidification may enter the anode and cathode flow channels. At low cell power demands, typically below 0.2 A/cm$^2$, the water may accumulate within the flow channels because the flow rate of the reactant gas is too low to force the water out of the channels. As the water accumulates, it forms droplets that continue to expand because of the relatively hydrophobic nature of the plate material. The droplets form in the flow channels substantially perpendicular to the flow of the reactant gas. As the size of the droplets increases, the flow channel is closed off, and the reactant gas is diverted to other flow channels because the channels are in parallel between common inlet and outlet manifolds. Because the reactant gas may not flow through a channel that is blocked with water, the reactant gas cannot force the water out of the channel. Those areas of the membrane that do not receive reactant gas as a result of the channel being blocked will not generate electricity, thus resulting in a non-homogenous current distribution and reducing the overall efficiency of the fuel cell. As more and more flow channels are blocked by water, the electricity produced by the fuel cell decreases, where a cell voltage potential less than 200 mV is considered a cell failure. Because the fuel cells are electrically coupled in series, if one of the fuel cells stops performing, the entire fuel cell stack may stop performing.

It is usually possible to purge the accumulated water in the flow channels by periodically forcing the reactant gas through the flow channels at a higher flow rate. However, on the cathode side, this increases the parasitic power applied to the air compressor, thereby reducing overall system efficiency. Moreover, there are many reasons not to use the hydrogen fuel as a purge gas, including reduced economy, reduced system efficiency and increased system complexity for treating elevated concentrations of hydrogen in the exhaust gas stream.

Reducing accumulated water in the channels can also be accomplished by reducing inlet humidification. However, it is desirable to provide some relative humidity in the anode and cathode reactant gases so that the membrane in the fuel cells remains hydrated. A dry inlet gas has a drying effect on the membrane that could increase the cell's ionic resistance, and limit the membrane's long-term durability.

It has been proposed by the present inventors to make bipolar plates for a fuel cell hydrophilic to improve channel water transport. A hydrophilic plate causes water in the channels to form a thin film that has less of a tendency to alter the flow distribution along the array of channels connected to the common inlet and outlet headers. If the plate material is sufficiently wettable, water transport through the diffusion media will contact the channel walls and then, by capillary force, be transported into the bottom corners of the channel along its length. The physical requirements to support spontaneous wetting in the corners of a flow channel are described by the Concus-Finn condition, $$\beta + \frac{\alpha}{2} < 90°,$$

where $\beta$ is the static contact angle and $\alpha$ is the channel corner angle. For a rectangular channel $\alpha/2=45°$, which dictates that spontaneous wetting will occur when the static contact angle is less than 45°. For the roughly rectangular channels used in current fuel cell stack designs with composite bipolar plates, this sets an approximate upper limit on the contact angle needed to realize the beneficial effects of hydrophilic plate surfaces on channel water transport and low load stability.

SUMMARY OF THE INVENTION

In accordance with the teachings of the present invention, a flow field plate or bipolar plate for a fuel cell is disclosed that includes a conductive coating having formed nanopores that make the coating hydrophilic. Any suitable process can be used to form the nanopores in the coating. One process includes co-depositing a conductive material and a relatively unstable element on the plate, and then subsequently dissolving the unstable element to remove it from the coating and create the nanopores. Another suitable process includes using a low energy ion beam for ion beam lithography to make nanopores.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a bipolar plate for a fuel cell that includes a coating having nanopores is merely exemplary in nature, and is in no way intended to limit the invention or its applications or uses.

Figure 1:
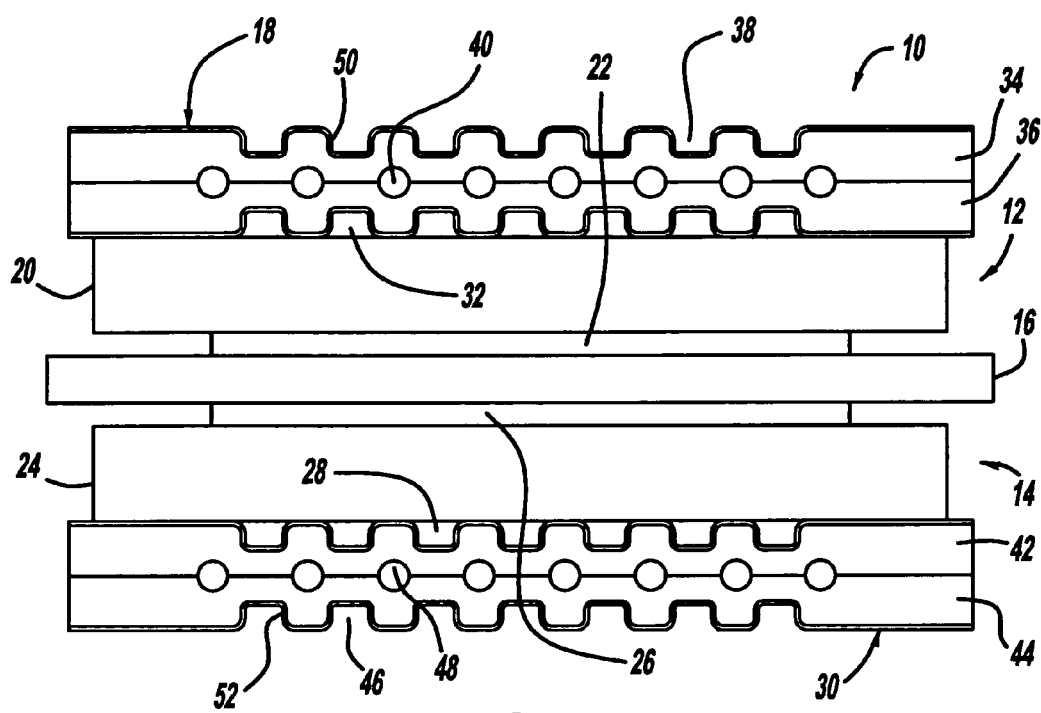
FIG. 1 is a cross-sectional view of a fuel cell in a fuel cell stack that includes a bipolar plate having a coating with nanopores that make the coating hydrophilic.

FIG. 1 is a cross-sectional view of a fuel cell 10 that is part of a fuel cell stack of the type discussed above. The fuel cell 10 includes a cathode side 12 and an anode side 14 separated by a perfluorosulfonic acid membrane 16. A cathode side diffusion media layer 20 is provided on the cathode side 12, and a cathode side catalyst layer 22 is provided between the membrane 16 and the diffusion media layer 20. Likewise, an anode side diffusion media layer 24 is provided on the anode side 14, and an anode side catalyst layer 26 is provided between the membrane 16 and the diffusion media layer 24. The catalyst layers 22 and 26 and the membrane 16 define an MEA. The diffusion media layers 20 and 24 are porous layers that provide for input gas transport to and water transport from the MEA. Various techniques are known in the art for depositing the catalyst layers 22 and 26 on the diffusion media layers 20 and 24, respectively, or on the membrane 16.

A cathode side flow field plate or bipolar plate 18 is provided on the cathode side 12 and an anode side flow field plate or bipolar plate 30 is provided on the anode side 14. The bipolar plates 18 and 30 are provided between the fuel cells in the fuel cell stack. A hydrogen reactant gas flow from flow channels 28 in the bipolar plate 30 reacts with the catalyst layer 26 to dissociate the hydrogen ions and the electrons. Airflow from flow channels 32 in the bipolar plate 18 reacts with the catalyst layer 22. The hydrogen ions are able to propagate through the membrane 16 where they carry the ionic current through the membrane. The by-product of this electrochemical reaction is water.

In this non-limiting embodiment, the bipolar plate 18 includes two sheets 34 and 36 that are formed separately and then joined together. The sheet 36 defines the flow channels 32 and the sheet 34 defines flow channels 38 for the anode side of an adjacent fuel cell to the fuel cell 10. Cooling fluid flow channels 40 are provided between the sheets 34 and 36, as shown. Likewise, the bipolar plate 30 includes a sheet 42 defining the flow channels 28, a sheet 44 defining flow channels 46 for the cathode side of an adjacent fuel cell, and cooling fluid flow channels 48. In the embodiments discussed herein, the sheets 34, 36, 42 and 44 are made of an electrically conductive material, such as stainless steel, titanium, aluminum, polymeric carbon composites, etc.

The bipolar plate 18 includes a conductive coating 50 and the bipolar plate 30 includes a conductive coating 52 that are provided to reduce the contact resistance between the plate 18 and 30 and the diffusion media layers 20 and 24, respectively. Various conductive materials are known in the art for this purpose, such as gold, platinum, ruthenium, rhodium and other noble metals. Other coatings comprised of carbon and a polymeric binder are also known in the art for this purpose. Typically the coatings 50 and 52 will be deposited to a thickness of about 10-1000 nm. However, these materials are sometimes hydrophobic in nature in that they have a surface energy that causes water to bead up and form droplets that have a high contact angle relative to the flow field channels, as discussed above. For stack stability purposes, especially at low loads, it is desirable that the surface of the plates 18 and 30 be hydrophilic so that water will wick away and have a low contact angle, preferably below 20°.

It has been discovered that the porosity of a substrate affects its water contact angle and improves the wetting of wetting liquids and non-wetting liquids. Porosity in the coatings can be created and controlled with precision and have been shown to increase the hydrophilicity of materials in general. Nanopores with defined separations and controlled diameters can be produced by several methods.

According to one embodiment of the invention, the coatings 50 and 52 are deposited on the plates 18 and 30, respectively, with a relatively unstable element that can be later leached out of the coating to provide nanopores therein that make the coating porous and increase its hydrophilicity. It has been shown that providing a textured surface morphology of the coatings 50 and 52 in this manner, the coatings 50 and 52 can be made hydrophilic so that that the contact angle of water forming in the flow field channels is reduced and its ability to wick water away is increased, thus helping stack stability. Particularly, the surface energy of the coatings 50 and 52 will be reduced so that the advancing and receding contact angle of the water in the flow field channel is about equal.

In another embodiment, the coatings 50 and 52 may be hydrophilic coatings, such as metal oxides including silicon dioxide, titanium dioxide, tin dioxide, tantalum oxide, etc. These coatings are intended to provide the desirable contact resistance discussed above and the desired hydrophilicity. However, these materials are sometimes prone to contamination during fuel cell operation that reduces their hydrophilicity. By providing morphological changes or porosity to the surface of the coatings 50 and 52 as discussed above, the naturally hydrophilic materials can be made super-hydrophilic and counteract the effect of surface contamination.

In one non-limiting example, the coatings 50 and 52 are silicon dioxide that has been co-deposited with zinc. The zinc is subsequently dissolved using a suitable material, such as an acid. When the zinc leaches out of the coatings 50 and 52 it leaves behind a porous structure that can help the surface to wick the water more than the non-porous silicon surface. This process can be applied to other coatings that are hydrophilic in nature, such as $TiO_2$, that can be deposited using various deposition techniques, such as PVD or CVD. Other examples of suitable materials that can be leached out of the coatings 50 and 52 include calcium and aluminum. By providing the nanopores in this manner, the surface of the coatings 50 and 52 is made porous.

Figure 2:
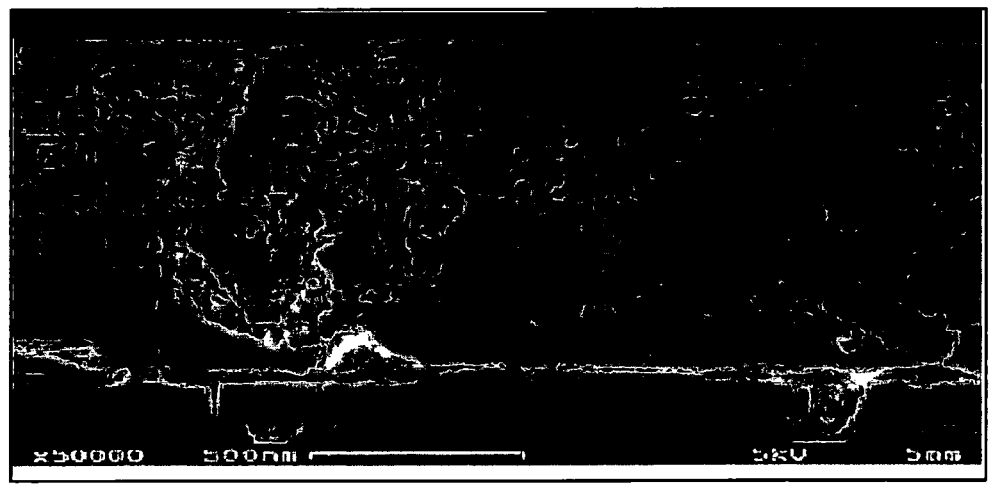
FIG. 2 is an SEM micrograph of nanoporous gold made by selective dissolution of silver from Ag—Au alloys immersed in nitric acid.

FIG. 2 shows a representative example of a suitable coating. Particularly, FIG. 2 shows an SEM micrograph of nanoporous gold made by selective dissolution of silver from Ag—Au alloys immersed in the nitric acid.

Further, electrical contact resistance can be maintained between the bipolar plates 18 and 30 and the diffusion media layers 20 and 24, respectively, by masking the lands between the flow channels 28 and 32 when the coatings 50 and 52 are being deposited so that the coating material is not deposited on the lands. Various masking techniques can be employed, such as water soluble masks, photolithography masks, or any other physical masks and combinations thereof.

Before the coatings 50 and 52 are deposited on the bipolar plates 18 and 30, the bipolar plates 18 and 30 are cleaned by a suitable process, such as ion beam sputtering, to remove the resistive oxide film on the outside of the plates 18 and 30 that may have formed. The coatings 50 and 52 can be deposited on the bipolar plates 18 and 30 by any suitable technique including, but not limited to, physical vapor deposition processes, chemical vapor deposition (CVD) processes, thermal spraying processes, spin coating processes, dip coating processes and sol-gel processes. Suitable examples of physical vapor deposition processes include electron beam evaporation, magnetron sputtering and pulsed plasma processes. Suitable chemical vapor deposition processes include plasma enhanced CVD and atomic layer deposition processes.

Figure 3:
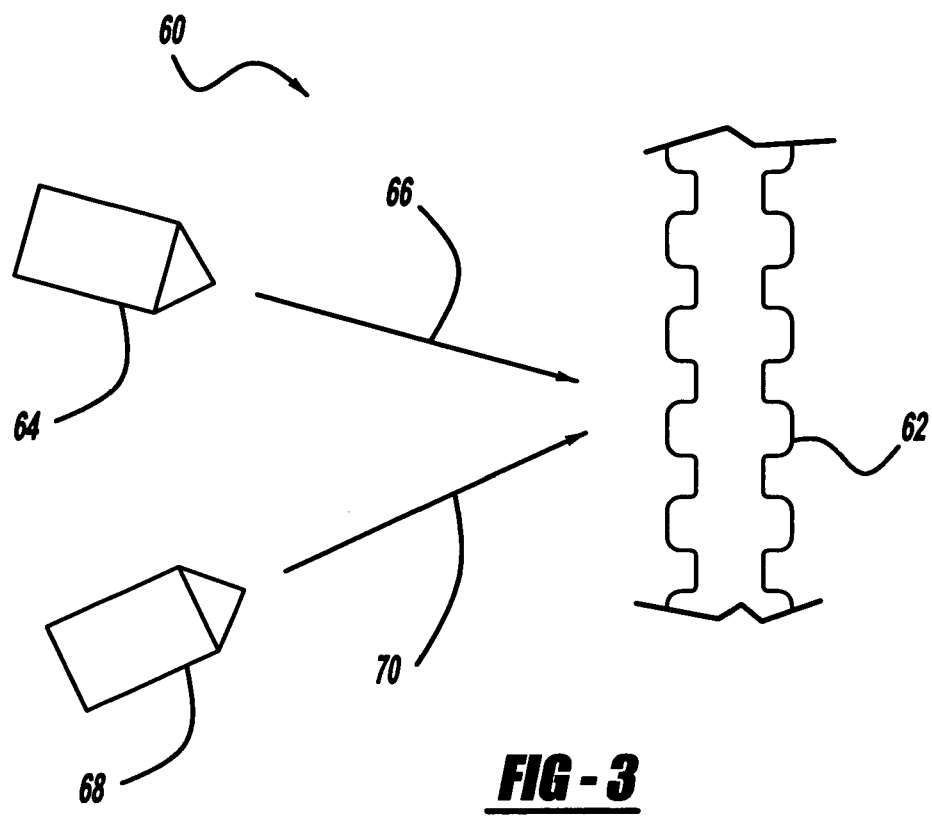
FIG. 3 is a plan view of a system for forming the coating on the bipolar plate.
Figure 4:
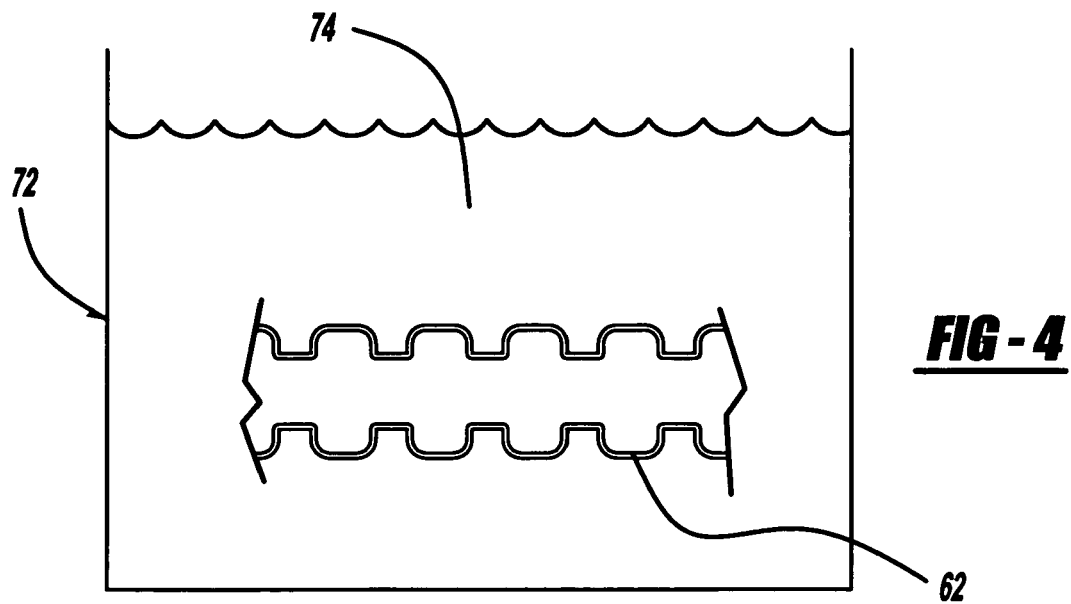
FIG. 4 is a depiction of a bath for removing an unstable material from the coating to provide nanopores.

Forming the nanopores in the coatings 50 and 52 can be performed by any suitable process. FIG. 3 is a plan view of a system 60 for forming nanopores in a bipolar plate 62. A suitable device 64 emits a stream 66 of the coating material at the bipolar plate 62 to cause the coating to be deposited on the plate 62. Additionally, a suitable device 68 emits a stream 70 of the material to be co-deposited with the coating that will be later removed to form the nanopores on the coating. Once the coating material and leachable material have been deposited on the plate 62, then the plate 62 is placed in a bath to remove the leachable material. FIG. 4 shows a container 72 including a suitable fluid 74, such as sulfuric acid, that removes the leachable material from the coating to form the nanopores.

According to one embodiment of the invention, the device 64 emits the stream 66 of the coating material at the bipolar plate 62 to cause the coating to be deposited thereon. The device 68 is an ion beam device that emits an ion beam of low energy Argon ions (Ar+) 70. The Ar+ ions selectively removes the coating to create nano-porosity in the coating.

In another process of the invention, a hybrid approach may be used. Particularly, an inorganic material, such as gold (Au), is used with an organic material, such as a polymer. The polymer can subsequently be leached out of the coating leaving behind a network of nanoporous gold.

In another process of the invention, a combination of polymers may be used to create a nanoporous solid. The nanoporous solid is then heated so that one of the polymers degrades and escapes the coating.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell comprising a flow field plate being made of a plate material, said flow field plate including a plurality of flow channels responsive to a reactant gas, said flow field plate further including a coating deposited on its outer surface and within the plurality of flow channels, wherein an outer surface of the coating has been formed to have nanopores that operate to make the coating hydrophilic and wick water away.

2. The fuel cell according to claim 1 wherein the plate material is selected from the group consisting of stainless steel, titanium, aluminum and a polymer-carbon based material.

3. The fuel cell according to claim 1 wherein the coating is a metal.

4. The fuel cell according to claim 1 wherein the coating is selected from the group consisting of gold, platinum, ruthenium, rhodium and other noble metals.

5. The fuel cell according to claim 1 wherein the coating is a metal oxide.

6. The fuel cell according to claim 5 wherein the metal oxide coating is selected from the group consisting of silicon dioxide, titanium dioxide, tin dioxide, tantalum oxide.

7. The fuel cell according to claim 1 wherein the nanopores in the coating are formed by depositing an unstable material with the coating onto the flow field plate, and then later removing the unstable material.

8. The fuel cell according to claim 7 wherein the unstable material is selected from the group consisting of zinc, aluminum and calcium.

9. The fuel cell according to claim 1 wherein the nanopores in the coating are formed by bombarding low energy ions with the coating onto the flow field plate, and then later removing the ions from the coating.

10. The fuel cell according to claim 9 wherein the ions are Argon ions.

11. The fuel cell according to claim 1 wherein the nanopores in the coating are formed by depositing an inorganic material and an organic material and subsequently removing the organic material.

12. The fuel cell according to claim 11 wherein the inorganic material is gold and the organic material is a polymer.

13. The fuel cell according to claim 1 wherein the nanopores in the coating are formed by depositing a combination of polymers on the flow field plate, and then heating the flow field plate to degrade one of the polymers so that it escapes from the coating.

14. The fuel cell according to claim 1 wherein the coating has a thickness in the range of 10-1000 nm.

15. The fuel cell according to claim 1 wherein the flow field plate is selected from a group consisting of anode side flow field plates and cathode side flow field plates.

16. The fuel cell according to claim 1 wherein lands between the flow channels are masked when the coating is deposited on the flow field plate to prevent the coating material from being deposited on the lands to provide a good contact resistance for the fuel cell.

17. The fuel cell according to claim 1 wherein the coating is deposited by a process selected from the group consisting of physical vapor deposition processes, chemical vapor deposition (CVD) processes, thermal spraying processes, spin coating processes, dip coating processes and sol-gel processes, electron beam evaporation, magnetron sputtering and pulsed plasma processes, plasma enhanced CVD and atomic layer deposition processes.

18. A fuel cell stack comprising a plurality of fuel cells, each fuel cell including:
   a membrane;
   an anode side bipolar plate on one side of the membrane, said anode side bipolar plate including a plurality of flow channels and a coating deposited on its outer surface and within the flow channels; and
   a cathode side bipolar plate on the other side of the membrane, said cathode side bipolar plate including a plurality of flow channels and a coating deposited on its outer surface and within the flow channels, wherein an outer surface of the coatings have been formed to have nanopores that operate to make the coatings hydrophilic and wick water away.

19. The fuel cell stack according to claim 18 wherein the coatings are a metal.

20. The fuel cell stack according to claim 19 wherein the coatings are selected from the group consisting of gold, platinum, ruthenium, rhodium and other noble metals.

21. The fuel cell stack according to claim 18 wherein the coatings are a metal oxide.

22. The fuel cell stack according to claim 21 wherein the metal oxide coatings are selected from the group consisting of silicon dioxide, titanium dioxide, tin dioxide, tantalum oxide.

23. The fuel cell stack according to claim 18 wherein the nanopores in the coatings are formed by depositing an unstable material with the coating onto the bipolar plate, and then later removing the unstable material.

24. The fuel cell stack according to claim 23 wherein the unstable material is selected from a group consisting of zinc, aluminum and calcium.

25. The fuel cell stack according to claim 18 wherein the nanopores in the coating are formed by bombarding low energy ions with the coating onto the flow field plate, and then later removing the ions from the coating.

26. The fuel cell stack according to claim 25 wherein the ions are Argon ions.

27. The fuel cell stack according to claim 18 wherein the nanopores in the coating are formed by depositing an inorganic material and an organic material and subsequently removing the organic material.

28. The fuel cell stack according to claim 27 wherein the inorganic material is gold and the organic material is a polymer.

29. The fuel cell stack according to claim 18 wherein the nanopores in the coating are formed by depositing a combination of polymers on the flow field plate, and then heating the flow field plate to degrade one of the polymers so that it escapes from the coating.

30. The fuel cell stack according to claim 18 wherein the coatings have a thickness in the range of 10-1000 nm.

* * * * *